United States Patent
Greetham et al.

(10) Patent No.: US 9,369,011 B2
(45) Date of Patent: Jun. 14, 2016

(54) UNIDIRECTIONAL ELECTRIC MACHINE COMPRISING A PERMANENT MAGNET ROTOR AND STATOR

(75) Inventors: Stephen Greetham, Malmesbury (GB); Andrew Charlton Clothier, Malmesbury (GB)

(73) Assignee: Dyson Technology Limited, Malmesbury, Wiltshire (GB)

(*) Notice: Subject to any disclaimer, the term of this patent is extended or adjusted under 35 U.S.C. 154(b) by 182 days.

(21) Appl. No.: 12/707,500

(22) Filed: Feb. 17, 2010

(65) Prior Publication Data
US 2010/0225196 A1    Sep. 9, 2010

(30) Foreign Application Priority Data
Mar. 3, 2009    (GB) .................................. 0903585.8

(51) Int. Cl.
*H02K 1/08* (2006.01)
*H02K 1/14* (2006.01)

(52) U.S. Cl.
CPC *H02K 1/143* (2013.01); *H02K 1/08* (2013.01); *H02K 1/146* (2013.01)

(58) Field of Classification Search
CPC .......... H02K 1/146; H02K 1/08; H02K 1/143
USPC ........... 310/49.23, 49.32, 49.34, 156.01, 162, 310/216.096, 254.1, 269, 272, 400 MM, 310/216.023; 318/400
IPC ....................................................... H02K 1/08
See application file for complete search history.

(56) References Cited

U.S. PATENT DOCUMENTS

| | | | | |
|---|---|---|---|---|
| 2,601,517 A * | 6/1952 | Hammes | ............... | H02K 21/185 310/156.25 |
| 2,704,334 A * | 3/1955 | Brailsford | ............... | H02M 7/58 310/39 |
| 3,675,059 A * | 7/1972 | Thees | ....................... | 310/156.08 |
| 3,979,616 A * | 9/1976 | Stechmann | ............... | 310/154.11 |
| 3,984,972 A * | 10/1976 | Yoshino | ................. | G04C 13/11 310/40 MM |
| 3,991,332 A * | 11/1976 | Kawamura | ............. | H02K 37/16 310/162 |
| 4,048,548 A * | 9/1977 | Nakajima et al. | ........ | 318/400.26 |
| 4,095,130 A * | 6/1978 | Oshima | ..................... | G04C 3/16 310/156.45 |
| 4,311,934 A | 1/1982 | Flaig | | |
| 4,324,992 A * | 4/1982 | Paratte | .................. | G04C 13/11 310/162 |

(Continued)

FOREIGN PATENT DOCUMENTS

| | | |
|---|---|---|
| EP | 0 848 481 | 6/1998 |
| EP | 1 261 101 | 11/2002 |

(Continued)

OTHER PUBLICATIONS

S. Bentouati, et al, "Permanent Magnet Brushless DC Motors for Consumer Products", Ninth International Conference on Electrical Machines and Drives, Conference Publication No. 468, IEE, 1999.*

(Continued)

*Primary Examiner* — John K Kim
(74) *Attorney, Agent, or Firm* — Morrison & Foerster LLP

(57) ABSTRACT

An electric machine that includes a permanent-magnet rotor and a stator. The stator includes a plurality of poles, each pole having a leading edge and a trailing edge relative to the direction of rotation of the rotor. The leading edge of each pole is thicker than the trailing edge in a direction normal to the rotational axis of the rotor.

10 Claims, 3 Drawing Sheets

(56) References Cited

U.S. PATENT DOCUMENTS

| | | | | |
|---|---|---|---|---|
| 4,542,329 | A * | 9/1985 | Tu Xuan | G04C 3/143 310/49.24 |
| 4,573,003 | A * | 2/1986 | Lipo | H02K 19/12 310/264 |
| 4,665,330 | A * | 5/1987 | Chatelain | G04C 13/11 310/49.32 |
| 5,465,019 | A * | 11/1995 | Kliman | H02K 29/03 310/156.04 |
| 5,986,419 | A * | 11/1999 | Archer et al. | 318/400.02 |
| 6,750,748 | B2 * | 6/2004 | Byram | 335/272 |
| 6,822,368 | B2 * | 11/2004 | Maslov | H02K 1/141 310/154.01 |
| 7,345,440 | B2 * | 3/2008 | Wang | H02P 1/46 318/400.04 |
| 7,560,843 | B2 * | 7/2009 | Kamiya | B60L 9/18 310/166 |
| 2004/0239200 | A1 * | 12/2004 | Strahan | H02K 21/185 310/162 |
| 2006/0197478 | A1 * | 9/2006 | Wang et al. | 318/254 |
| 2009/0302704 | A1 * | 12/2009 | Li et al. | 310/158 |
| 2010/0225196 | A1 * | 9/2010 | Greetham et al. | 310/216.096 |

FOREIGN PATENT DOCUMENTS

| | | |
|---|---|---|
| GB | 2 010 593 | 6/1979 |
| JP | 52-147713 | 12/1977 |
| JP | 60-128483 | 8/1985 |
| JP | 60-128483 U | 8/1985 |
| JP | 10-23690 | 1/1998 |
| JP | 2000-92755 | 3/2000 |
| JP | 2003-153471 | 5/2003 |
| WO | WO-86/06891 | 11/1986 |

OTHER PUBLICATIONS

John K. Kim, "Novel Scheme of Driving Single Phase PM AC Motor in Uni-Direction", IEEE, 2007.*

International Search Report and Written Opinion mailed Aug. 16, 2011, directed to Application No. PCT/GB2010/050299; 9 pages.

GB Search Report dated Jun. 22, 2009, directed to counterpart GB Patent Application No. 0903585.8; 2 pages.

* cited by examiner

UNIDIRECTIONAL ELECTRIC MACHINE COMPRISING A PERMANENT MAGNET ROTOR AND STATOR

REFERENCE TO RELATED APPLICATIONS

This application claims the priority of United Kingdom Application No. 0903585.8, filed Mar. 3, 2009, the entire contents of which are incorporated herein by reference.

FIELD OF THE INVENTION

The present invention relates to an electric machine.

BACKGROUND OF THE INVENTION

FIG. 1 illustrates an electric motor 1 comprising a stator 2 and a permanent-magnet rotor 3. The stator 2 comprises a stator core 4 about which a winding 5 is wound. The stator core 4 comprises two poles 6,7 arranged on opposite sides of the rotor 3. When the rotor 3 is in the position of maximum torque, magnetic saturation occurs at the edges of the poles 6,7. In order to avoid magnetic saturation, the edges of each pole 6,7 may be thickened. However, increasing the thickness of the edges increases the inductance of the stator winding 5.

SUMMARY OF THE INVENTION

In a first aspect, the present invention provides an electric machine comprising a permanent-magnet rotor and a stator, the stator comprising a plurality of poles, each pole having a leading edge and a trailing edge relative to the direction of rotation of the rotor, the leading edge being thicker than the trailing edge in a direction normal to the rotational axis of the rotor.

In having leading and trailing edges, the electric machine is intended to be unidirectional. By providing thicker leading edges, saturation at the leading edges is avoided or, at the very least, the saturation point is increased. Consequently, a less restrictive pathway is provided for magnetic flux through the stator. Moreover, since the leading edge is thicker in a direction normal to the rotational axis of the rotor, a less restrictive pathway for magnetic flux through the stator is provided in the direction of the rotor. The provision of thinner trailing edges reduces the inductance of a winding wound about the stator. Accordingly, a more powerful and efficient electric machine may be realised.

The leading edge of each pole is advantageously chamfered. By chamfering each of the leading edges, the inductance of a winding wound about the stator is further reduced. Since only the corners of the leading edges are chamfered, saturation at the leading edges continues to be avoided and thus there is no loss of magnetic performance.

Each pole preferably comprises a pole arc that extends between the leading edge and the trailing edge. Each of the leading and trailing edges may then extend between the pole arc and a side of the pole. Each pole is then thicker on one side of the pole arc.

Advantageously, each pole subtends an electrical angle of at least 130 degrees. Accordingly, the poles surround a good portion of the rotor, thereby providing good capture of rotor flux.

The stator may include at least one pair of opposing poles. The distance separating the leading edges of the opposing poles is then preferably at least that separating the trailing edges. The distance separating the leadings edges may be the same as that separating the trailing edges such that a symmetric air gap is created between the poles and a rotor. In having a symmetric air gap, capture of rotor flux by the poles can be increased, thereby providing improved back emf and thus a more efficient electric machine. More preferably, however, the distance separating the leading edges is greater than that separating the trailing edges. Consequently, the air gap between the rotor and the leading edge of each of the opposing poles is greater than that between the rotor and the trailing edge. This then ensures that the rotor parks at a particular position from which the rotor is required to cover a larger mechanical angle at start-up. In covering a larger mechanical angle, the rotor achieves greater momentum at the point of commutation and thus start-up is made easier.

Advantageously, each pole has a pole face, a first side and a second side extending from the pole face, and a pole arc formed in the pole face. The leading edge of each pole then extends from the pole arc to the first side and the trailing edge extends from the pole arc to the second side. The distance between a centreline bisecting the pole arc of each pole and the first side is then ideally greater than that between the centreline and the second side, at least in the region adjacent the pole face. In particular, the distance between the centre of the pole arc and the first side is ideally greater than that between the centre and the second side.

The stator is preferably c-shaped and has a pair of opposing poles separated by a slot opening. This then has the advantage that it is easier to wind a winding on to the stator via the slot opening. Additionally, a high fill factor for the winding can be achieved, which then reduces copper losses and thus improves efficiency. Furthermore, owing to the generally square or rectangular shape of the stator, stator laminations can be produced by punching sheet material with little waste.

Reference herein to a c-shaped stator core should also be understood to include u-shaped stator cores.

In a second aspect, the present invention provides an electric machine comprising a permanent-magnet rotor and a stator, the stator comprising a plurality of poles, each pole having a pole face adjacent the rotor, a first side and a second opposite side extending away from the pole face, a pole arc formed in the pole face, a leading edge extending between the pole arc and the first side and a trailing edge extending between the pole arc and the second side, wherein the leading edge is thicker than the trailing edge in a direction normal to a rotational axis of the rotor.

Since the stator has thicker leading edges and thinner trailing edges relative to the direction of rotation of the rotor, a more powerful and efficient electric machine may be realised.

In a third aspect, the present invention provides an electric machine comprising a permanent-magnet rotor and a stator, the stator comprising a pair of opposing poles, wherein each pole has a leading edge and a trailing edge relative to a direction of rotation of the rotor, the leading edge is thicker than the trailing edge in a direction normal to a rotational axis of the rotor, and a distance separating the leading edges is at least that separating the trailing edges.

Preferably, the distance separating the leading edges is greater than that separating the trailing edges. Consequently, the air gap between the rotor and the leading edge of each of the opposing poles is greater than that between the rotor and the trailing edge. This then ensures that the rotor parks at a particular position from which start-up is made easier.

BRIEF DESCRIPTION OF THE DRAWINGS

In order that the present invention may be more readily understood, embodiments of the invention will now be described, by way of example, with reference to the accompanying drawings, in which.

DETAILED DESCRIPTION OF THE INVENTION

Figure 1:
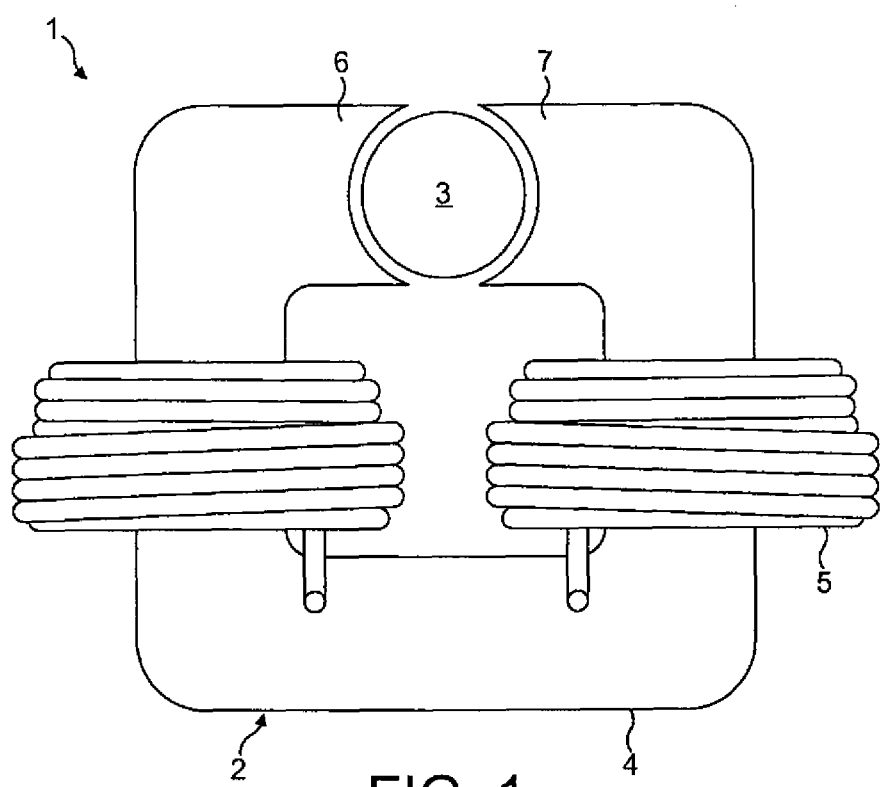
FIG. 1 illustrates a conventional motor.
Figure 2:
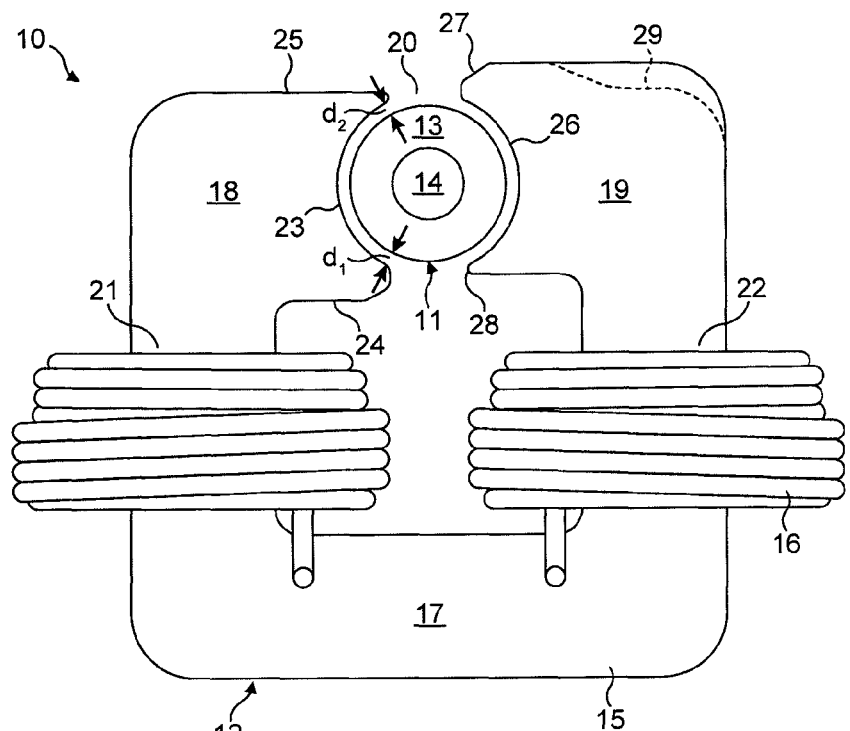
FIG. 2 illustrates a motor in accordance with the present invention.

The motor 10 of FIG. 2 comprises a rotor 11 and a stator 12. The rotor 11 comprises a two-pole permanent magnet 13 supported on a shaft 14, and the stator 12 comprises a stator core 15 about which a single-phase winding 16 is wound.

The stator core 15 is c-shaped and comprises a back 17, a pair of poles 18,19 separated by a slot opening 20, and a pair of necks 21,22 extending between the back 17 and the poles 18,19. The winding 16 is wound about each of the necks 21,22 of the stator core 15, but might equally be wound about the back 17 of the stator core 15.

Each pole 18,19 has a pole face 23 adjacent the rotor 11, a first side 24 and a second opposite side 25 extending away from the pole face 23. Each pole face 23 includes an arcuate recess or pole arc 26, a leading edge 27 and a trailing edge 28 relative to the direction of rotation of the rotor 11. The leading edge 27 extends between the pole arc 26 and the first side 24 of each pole 18,19, and the trailing edge 28 extends between the pole arc 26 and the second side 25 of each pole 18,19. The pole arc 26 thus extends between the leading and trailing edges 27,28.

The leading edge 27 of each pole 18,19 is thicker than that of the trailing edge 28 in at least a direction normal to the rotational axis of the rotor 11. Additionally, the leading edge 27 of each pole 17,18 is chamfered, i.e. the corner defined by the pole face 23 and the first side 25 of each pole 18,19 is chamfered.

The pole arcs 26 of the two poles 18,19 are slightly misaligned such that the distance between the leading edges 27 of the two poles 18,19 is greater than that between the trailing edges 28.

The rotor 11 is supported between the two poles 18,19 of the stator core 15. Owing to the misalignment in the pole arcs 26, the air gap between the rotor 11 and the pole arc 26 of each of the two poles 18,19 is asymmetric. In particular, the air gap between the rotor 11 and the pole arc 26 at the leading edge 27 ($d_1$ in FIG. 2) is greater than that at the trailing edge 28 ($d_2$ in FIG. 2).

Figure 3:
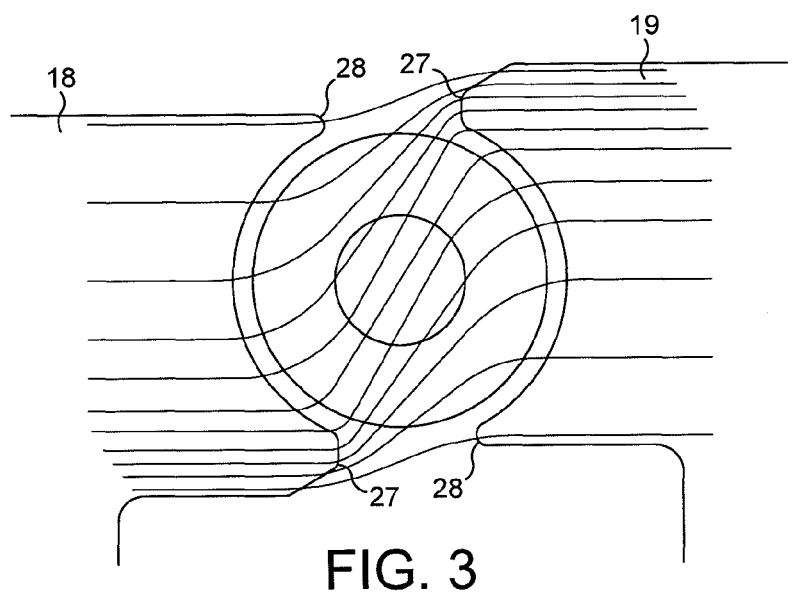
FIG. 3 illustrates the magnetic flux through the poles of the motor at a position of maximum torque.

During operation of the motor 10, the winding 16 is sequentially energised causing the rotor 11 to rotate; in the particular embodiment illustrated in FIGS. 2 and 3, the rotor 11 is caused to rotate in a clockwise direction. At the position of maximum torque, as is illustrated in FIG. 3, the magnetic flux through the poles 18,19 is concentrated at the leading edges 27 (i.e. the magnetic flux density is greatest at the leading edges 27 of each pole 18,19). By having thicker leading edges 27, saturation of the stator core 15 at the leading edges 27 is avoided or, at the very least, the saturation point is increased. Consequently, a less restrictive pathway is provided for the magnetic flux through the stator 12, and thus a more efficient motor 10 is achieved.

The provision of thinner trailing edges 28 reduces the inductance of the stator winding 16. At the position of maximum torque, the magnetic flux through each of the trailing edges 28 is relatively small and thus saturation at the trailing edges 28 does not occur. Since the angle subtended by the pole arc 26 is unchanged, each pole 18,19 continues to capture the same amount magnetic flux from the rotor 11. Consequently, the provision of thinner trailing edges 28 reduces inductance without any loss of magnetic performance.

By chamfering the leading edge 27 of each pole 18,19, the inductance of the stator winding 16 is further reduced. Since only the corner of the leading edge 27 is chamfered, saturation at the leading edge 27 continues to be avoided. Consequently, there is no loss of magnetic performance.

The asymmetric air gap between the rotor 11 and each of the poles 18,19 ensures that the rotor 11 parks in a position from which it can be easily started. Since the air gap is smallest at the trailing edges 28, the rotor 11 is required, at start-up, to cover a larger mechanical angle prior to commutation. Consequently, the rotor has greater momentum at commutation and thus start-up is made easier.

The present invention thus provides a stator 12 of lower inductance with improved magnetic performance. In particular, inductance is lowered without adversely affecting magnetic saturation or the capacity to capture rotor flux. This is achieved by shaping the poles of the stator core 15 such that each pole 18,19 has a thicker leading edge 27 and a thinner trailing edge 28. A thinner trailing edge 28 reduces the inductance of the stator winding 16, while a thicker leading edge 27 ensures that saturation of the stator core 15 at the poles 18,19 is avoided or, at the very least, that the saturation point is increased. In providing a stator 12 of lower inductance, current can be more quickly driven into the stator winding 16 and thus a more powerful and efficient motor 10 may be realised.

A drawback with the motor 10 of the present invention is that the aforementioned advantages are realised only when driving the rotor 11 in a single direction. For the embodiment illustrated in FIGS. 2 and 3, the leading and trailing edges 27,28 of each pole 18,19 are arranged for clockwise rotation of the rotor 11. If an attempt is made to drive the rotor 11 in an anti-clockwise direction then, at the point of maximum torque, the magnetic flux density is greatest at the trailing edges 28 of the poles 18,19. Since the trailing edges 28 are thinner, saturation of the stator core 15 is likely to occur at the edges 28. The motor 10 of the present invention is therefore intended to be driven in a single direction only.

While the leading and trailing edges 27,28 of the embodiment illustrated in FIGS. 2 and 3 are arranged for clockwise rotation, the edges 27,28 might equally be arranged (i.e. switched) for anti-clockwise rotation.

In the embodiment described above, an asymmetric air gap between the rotor 11 and each pole 18,19 is achieved by misaligning the two pole arcs 26. An asymmetric air gap might alternatively be formed by having pole arcs of non-constant curvature, or by having a stepped pole arc. Alternatively, the asymmetric air gap may be omitted altogether and parking of the rotor 11 may then be achieved by alternative means, e.g. a small permanent magnet.

Figure 4:
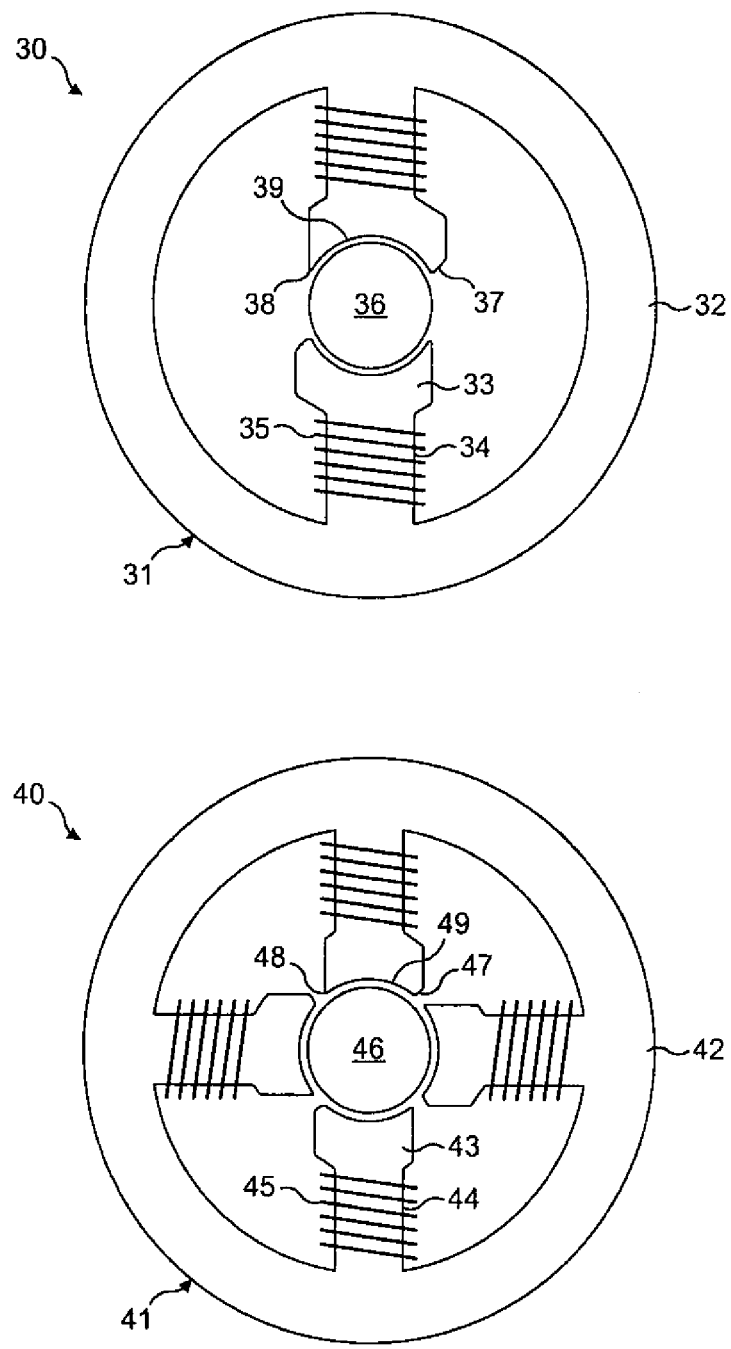
FIG. 4 illustrates alternative motors in accordance with the present invention.

The motor 10 described above is a single-phase, two-pole motor; additionally, the stator core 15 is c-shaped. However, the motor 10 might comprise any number poles. Moreover, the stator core 15 need not be c-shaped. By way of example, FIG. 4 illustrates two alternative motors 30,40 that incorporate the pole geometry described above.

Both motors 30,40 have a stator core 31,41 that is shaped differently to that described above. The stator core 31,41 of each motor 30,40 comprises a circular back 32,42, a plurality of poles 33,43, and a plurality of necks 34,44 that extend radially between the back 32,42 and the poles 33,43. Both motors 30,40 are single phase, with the winding 35,45 wound about each of the necks 34,44 of the stator core 31,41. The first motor 30 comprises a two-pole rotor 36, and the stator core 31 comprises a single pair of opposing poles 33. The second motor 40, on the other hand, comprises a four-pole rotor 46 and the stator core 41 comprises two pairs of opposing poles 43. In spite of the differences between the motors 1,30,40, the stator cores 31,41 nevertheless have the same pole geometry as that described above with reference to FIGS. 2 and 3. In particular, each pole has a leading edge 37,47, a trailing edge 38,48 and a pole arc 39,49 extending between the leading edge 37,47 and the trailing edge 38,48. Moreover, the leading edge 37,47 of each pole 33,43 is thicker than that of the trailing edge 38,48 in at least a direction normal to the rotational axis of the rotor 36,46.

While the stator core need not be c-shaped, there are nevertheless advantages in having a c-shaped stator core 15. In particular, it is generally easier to wind the winding 16 on to the stator core 15 by means of the slot opening 20 between the poles 18,19. Additionally, a high fill factor for the winding 16 can be achieved, which then reduces copper losses and improves motor efficiency. Furthermore, owing to the generally square shape of the stator core 15, the stator core laminations can be produced by punching sheet material (e.g. steel) with little waste.

In order that saturation of the stator core 15 is avoided at the leading edges 27, it is necessary only that the first side 24 of each pole 18,19 is thicker in the region adjacent the pole face 23. Material may therefore be removed from the first side 24 of a pole 19 remote from the pole face 23 (e.g. as illustrated by the dotted line 29 in FIG. 2). This then has the advantage of reducing the outer profile of the stator core 15, thereby making the stator core 15 smaller and cheaper.

In each of the embodiments described above, each pole 18,19 subtends an electrical angle of at least 130 degrees. Accordingly, the poles 18,19 surround a good portion of the rotor 11 and thus capture a good portion of the rotor flux.

The present invention provides a stator of lower inductance with improved magnetic performance. In particular, inductance is lowered without adversely affecting magnetic saturation or the capacity to capture rotor flux. Consequently, a more powerful and efficient motor may be realised.

While the present invention has thus far been described with reference to a motor, it will be appreciated that the stator core might equally form part of a generator or other electric machine in order to achieve improved performance.

The invention claimed is:

1. An unidirectional electric machine comprising a permanent-magnet rotor and a stator, the stator comprising a pair of opposing poles, wherein each pole has a pole are extending between a leading edge and a trailing edge relative to a single direction of rotation of the rotor, each pole is thicker in a region adjacent to the leading edge in a respective first direction that is normal to the rotational axis of the rotor that in a region adjacent to the trailing edge in a respective second direction which is normal to the rotational axis of the rotor, the single direction defined as the direction from the thicker leading edge of one pole toward the thinner trailing edge of the same pole, and an air gap between the rotor and the pole are at the leading edge that is thicker than the trailing edge is greater than between the rotor and the pole are the trailing edge, such that the distance separating the thicker leading edges of the opposing poles is greater than the distance separating the thinner trailing edges of the opposing poles.

2. The electric machine of claim 1, wherein the leading edge of each pole is chamfered.

3. The electric machine of claim 1, wherein the leading edge and the trailing edge of each pole extends between the pole arc and a side of the pole.

4. The electric machine of claim 3, wherein each pole has a pole face adjacent the rotor, a first side and a second opposite side extending away from the pole face, and wherein the pole arc is formed in the pole face, and the leading edge extends from the pole arc to the first side and the trailing edge extends from the pole arc to the second side.

5. The electric machine of claim 4, wherein the shortest distance between a centre of the pole arc and the first side is greater than the shortest distance between the centre of the pole arc and the second side.

6. The electric machine of claim 1, wherein each pole subtends an electrical angle of at least 130 degrees.

7. The electric machine of claim 1, wherein the stator is c-shaped and comprises a pair of opposing poles separated by a slot opening.

8. The electric machine of claim 1, wherein the electric machine comprises a single-phase winding.

9. A unidirectional electric machine comprising a permanent-magnet rotor and a stator, the stator comprising a pair of opposing poles, wherein each pole has a pole arc extending between a leading edge and a trailing edge relative to a single direction of rotation of the rotor, each pole is thicker in a region adjacent to the leading edge in a respective first direction that is normal to the rotational axis of the rotor than in a region adjacent to the trailing edge in a respective second direction which is normal to the rotational axis of the rotor, and the leading edge only is chamfered, wherein the single direction is defined as the direction from the thicker leading edge of one pole toward the thinner trailing edge of the same pole, and the distance separating the thicker leading edges of the opposing poles is greater than the distance separating the thinner trailing edges of the opposing poles.

10. A unidirectional electric machine comprising a permanent-magnet rotor and a stator, the stator comprising a c-shaped stator core that includes a back, a pair of opposing poles, and a pair of necks each extending between the back and the opposing poles, wherein each pole has a pole arc extending between a leading edge and a trailing edge relative to a single direction of rotation of the rotor, each pole is thicker in a region adjacent to the leading edge in a respective first direction that is normal to the rotational axis of the rotor than in a region adjacent to the trailing edge in a respective second direction which is normal to the rotational axis of the rotor, the single direction defined as the direction from the thicker leading edge of one pole toward the thinner trailing edge of the same pole, and an air gap between the rotor and the pole arc at the leading edge that is thicker than the trailing edge is greater than between the rotor and the pole arc at the trailing edge, such that the distance separating the thicker leading edges of the opposing poles is greater than the distance separating the thinner trailing edges of the opposing poles.

* * * * *